（12）United States Patent
Ben-Chen et al.

(10) Patent No.: US 11,347,667 B2
(45) Date of Patent: May 31, 2022

(54) BUS CONTROLLER AND RELATED METHODS

(71) Applicant: QUALCOMM Incorporated, San Diego, CA (US)

(72) Inventors: Tomer Rafael Ben-Chen, Amikam (IL); Sharon Graif, Zichron Yakov (IL); Shaul Yohai Yifrach, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/243,698

(22) Filed: Jan. 9, 2019

(65) Prior Publication Data

US 2019/0213150 A1 Jul. 11, 2019

Related U.S. Application Data

(60) Provisional application No. 62/615,931, filed on Jan. 10, 2018.

(51) Int. Cl.
*G06F 11/07* (2006.01)
*G06F 11/30* (2006.01)
(Continued)

(52) U.S. Cl.
CPC ............ *G06F 13/20* (2013.01); *G06F 13/362* (2013.01); *G06F 13/4208* (2013.01); *G06F 2213/0054* (2013.01)

(58) Field of Classification Search
None
See application file for complete search history.

(56) References Cited

U.S. PATENT DOCUMENTS 4,728,754 A * 3/1988 Fowler ................ G06F 13/4217
178/2 C
5,911,052 A * 6/1999 Singhal ................ G06F 13/368
710/113
(Continued)

FOREIGN PATENT DOCUMENTS

EP 3095037 A1 11/2016

OTHER PUBLICATIONS

"What is fragmented IP protocol wireshark?", Dec. 16, 2009, www.wireshark.org (Year: 2009).*

(Continued)

*Primary Examiner* — Hyun Nam
(74) *Attorney, Agent, or Firm* — Muncy, Geissler, Olds & Lowe, P.C.

(57) ABSTRACT

The disclosure includes systems and methods for bus control. A method comprises receiving a data exchange request, wherein the data exchange request includes a data exchange tag that identifies a data exchange, splitting the data exchange into a plurality of fractional data transactions, providing one or more bus commands to a system bus, receiving, at the bus controller, one or more acceptance notifications indicating that the one or more of the plurality have been accepted by the system bus, assigning transaction identifiers (TIDs) corresponding to the one or more of the plurality of fractional data transactions, receiving one or more completion notifications indicating that the one or more of the plurality have been completed, determining that each of the plurality of fractional data transactions associated with the data exchange tag have been completed, and notifying the processor that the requested data exchange has been completed.

30 Claims, 7 Drawing Sheets

(51) Int. Cl.
 G06F 13/20 (2006.01)
 G06F 13/42 (2006.01)
 G06F 13/362 (2006.01)

(56) References Cited

U.S. PATENT DOCUMENTS

| | | |
|---|---|---|
| 7,107,367 B1 | 9/2006 | Hughes |
| 2002/0184428 A1 | 12/2002 | Bennett et al. |
| 2003/0110325 A1* | 6/2003 | Roach ................ G06F 13/28 710/22 |
| 2006/0271507 A1* | 11/2006 | Anzalone ........... G06F 16/2358 |
| 2007/0067504 A1* | 3/2007 | Lau .................... H04L 49/901 710/22 |
| 2007/0168545 A1* | 7/2007 | Venkatsubra ........ H04L 1/0083 709/236 |
| 2008/0147902 A1* | 6/2008 | Ishii .................. G06F 11/0727 710/19 |
| 2009/0276598 A1* | 11/2009 | Brossier .............. H04L 67/1097 711/170 |
| 2010/0183009 A1* | 7/2010 | Baratakke ............. G06F 9/5077 370/392 |
| 2011/0107065 A1* | 5/2011 | Ikonomopoulos .. G06F 13/4022 712/220 |
| 2014/0189212 A1* | 7/2014 | Slaight ................ G06F 12/0866 711/103 |
| 2016/0381549 A1* | 12/2016 | Lam ........................ H04W 4/06 455/414.1 |

OTHER PUBLICATIONS

"What is in a IP packet?", Circa 1970 (Year: 1970).*
"History of TCP/IP", Circa 1970, SCOS.Training (Year: 1970).*
International Search Report and Written Opinion—PCT/US2019/012960—ISA/EPO—dated May 22, 2019.

* cited by examiner

| 501 | 502 | 503 |
|---|---|---|
| 0000 | 00 | 1 |
| 0001 | 01 | 1 |
| 0002 | 01 | 1 |
| 0003 | 02 | 1 |
| 0004 | 02 | 0 |
| 0005 | 03 | 0 |
| 0006 | 03 | 0 |
| 0007 | 03 | 0 |
| 0008 | 03 | 0 |

FIG. 5

BUS CONTROLLER AND RELATED METHODS

CROSS-REFERENCE TO RELATED APPLICATION

The present Application for Patent claims the benefit of U.S. Provisional Patent Application No. 62/615,931, entitled "BUS CONTROLLER AND RELATED METHODS," filed Jan. 10, 2018, and assigned to the assignee hereof and hereby expressly incorporated herein by reference in its entirety.

INTRODUCTION

Aspects of this disclosure relate generally to electronic devices, and in particular to electronic devices that include a system bus and a bus controller for controlling the system bus.

A processor in a computer, smartphone, or other electronic device may communicate with other components using the system bus. The other components may include local memory within the electronic device, peripheral devices, etc. The other components may exchange data with the processor and/or a random access memory (RAM) associated with the processor. The processor may participate in data transactions that involve the system bus and/or the other components.

The processor may send a data transaction request that may include a source address, a destination address, and/or a length. Data associated with the data transaction request may be exchanged among various components via the system bus. When the data transaction commences and/or completes, the processor may be notified. For example, the processor may be provided with a transaction identifier (TID) indicating that a bus command corresponding to the data transaction has been accepted by the system bus.

Implementations that rely on simple bus controllers may consume excessive processing resources. In an electronic device with a simple bus controller, software is executed by the processor to generate data transaction requests having particular characteristics (manageable size, appropriate location and alignment, etc.) and maintain a record of outstanding data transactions. However, the execution of software consumes the processing resources of the processor, resulting in high levels of MIPS (millions-of-instructions-per-second).

There have been efforts in the field to increase the efficiency of electronic devices by using hardware acceleration to facilitate data exchanges. For example, a more complex bus controller may include a direct memory access (DMA) engine designed specifically to relieve the processor of a large fraction of the burden associated with large data exchanges. However, a DMA engine must maintain long command lists within the DMA engine hardware, and is further required to manage descriptor prefetch, arbitration, completions, interrupt coalescing, ordering, and other data transaction tasks. As a result, it may be relatively expensive to use hardware acceleration for data transactions.

In some electronic devices, the costs of hardware acceleration may be justified. However, in other electronic devices (for example, those with small processors, low/moderate bandwidth, little/no cache, low MIPS requirements, and/or high cost penalties for stalls and excessive MIPS), the additional costs of hardware acceleration may be prohibitive. As a result, the electronic device may be forced to tolerate the processing consumption associated with the previously-described software-based approach. Accordingly, new techniques for handling large data exchanges are needed. These new techniques should consume fewer processing resources relative to the software approach, while simultaneously avoiding the high costs associated with full hardware acceleration.

SUMMARY

The following summary is an overview provided solely to aid in the description of various aspects of the disclosure and is provided solely for illustration of the aspects and not limitation thereof.

In accordance with aspects of the disclosure, a method is provided. The method may comprise splitting, at a bus controller, a data exchange associated with a data exchange tag into a plurality of fractional data transactions, receiving, at the bus controller, one or more completion notifications indicating that one or more of the plurality of fractional data transactions have been completed, determining, in response to the one or more completion notifications, that each of the plurality of fractional data transactions associated with the data exchange tag have been completed, and notifying a processor that the data exchange has been completed in response to the determination that each of the plurality of fractional data transactions has been completed.

In accordance with other aspects of the disclosure, an electronic device is provided. The electronic device may comprise memory configured to store data, instructions, or a combination thereof, a processor coupled to the memory, a bus controller coupled to the processor, and a system bus coupled to the bus controller. The bus controller may be configured to split a data exchange associated with a data exchange tag into a plurality of fractional data transactions; receive one or more completion notifications indicating that one or more of the plurality of fractional data transactions have been completed, determine, in response to the one or more completion notifications, that each of the plurality of fractional data transactions associated with the data exchange tag have been completed, and notify the processor that the data exchange has been completed in response to the determination that each of the plurality of fractional data transactions has been completed.

In accordance with yet other aspects of the disclosure, an apparatus is provided. The apparatus may comprise means for splitting a data exchange associated with a data exchange tag into a plurality of fractional data transactions, means for receiving one or more completion notifications indicating that one or more of the plurality of fractional data transactions have been completed, means for determining, in response to the one or more completion notifications, that each of the plurality of fractional data transactions associated with the data exchange tag have been completed, and means for notifying that the data exchange has been completed in response to the determination that each of the plurality of fractional data transactions has been completed.

BRIEF DESCRIPTION OF THE DRAWINGS

The accompanying drawings are presented to aid in the description of various aspects of the disclosure and are provided solely for illustration of the aspects and not limitation thereof.

FIG. 5 generally illustrates an example implementation of the completion table depicted in FIG. 2.

DETAILED DESCRIPTION

As noted above, new techniques are required that improve on the processing consumption associated with a software approach, while simultaneously avoiding the high costs associated with hardware acceleration. Accordingly, a processor in accordance with aspects of the disclosure may send a data exchange request to a bus controller, wherein the data exchange request includes a data exchange tag that uniquely identifies the requested data exchange. Upon receiving the data exchange request, the bus controller may be configured to split the requested data into a plurality of fractional data transactions. The size, location, or alignment of the fractional data transactions (and the decision as to whether and how the requested data exchange should be split) may be based on constraints associated with a system bus.

The bus controller may send to the system bus a bus command corresponding to an individual fractional data transaction. Moreover, each fractional data transaction may be assigned a transaction identifier (TID) that distinguishes it from other fractional data transactions, and the assigned TIDs may be stored, along with the corresponding data exchange tag, in a completion table. As each fractional data transaction is accepted, the processor may receive one or more notifications that the fractional data transaction has been accepted by the system bus. After it is notified of acceptance, the processor may complete other processing tasks while waiting for a notification that the requested data exchange is complete.

As each fractional data transaction is completed, the bus controller may update the completion table with a completion status of a corresponding fractional data transaction (with a particular TID). Once all the TIDs associated with a given data exchange tag are determined to be complete, the bus controller may notify the processor that the data exchange associated with the original data exchange request is complete. In response, the processor may perform any tasks that were contingent on completion of the data exchange associated with the data exchange request.

Figure 1:
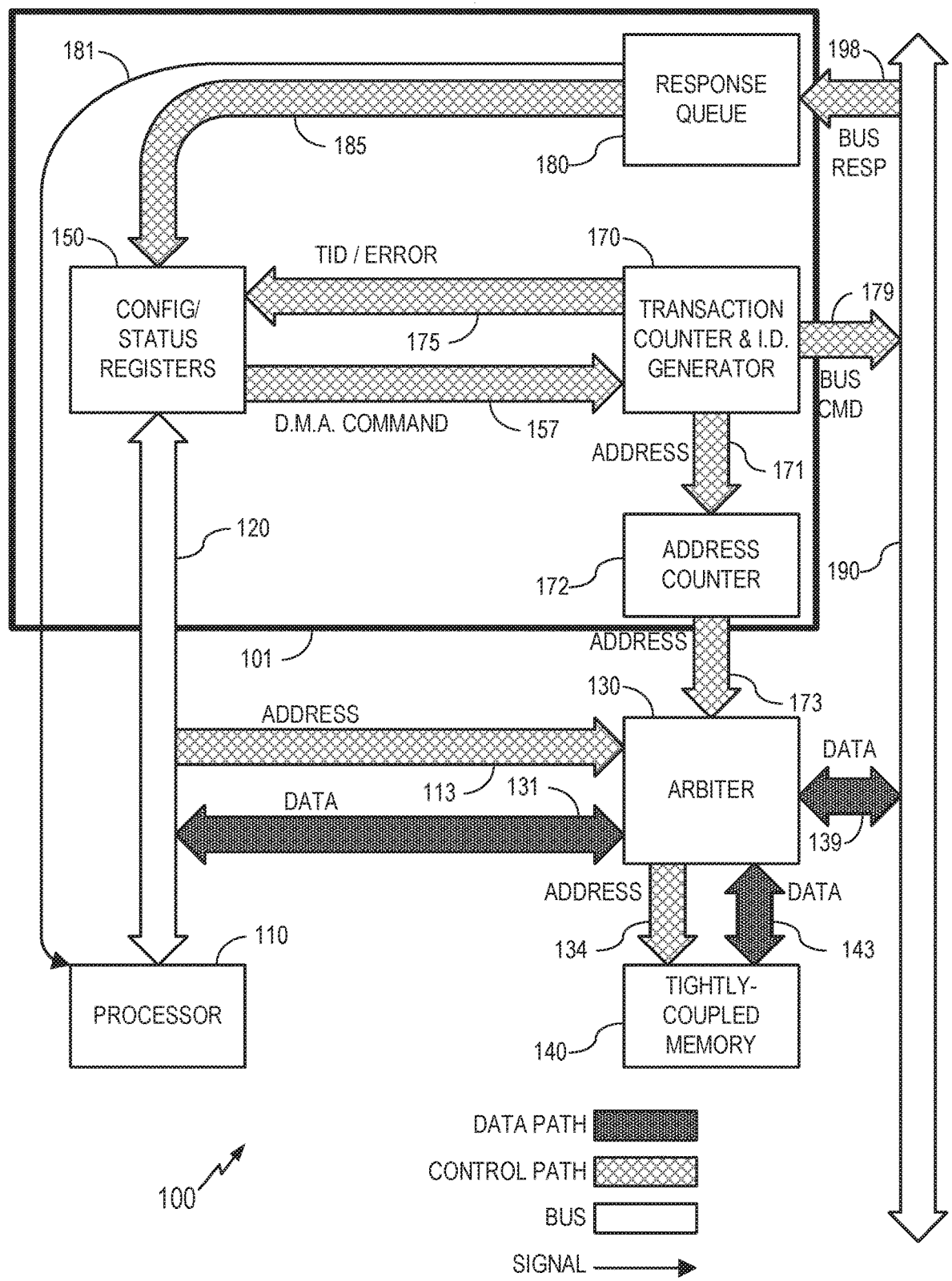
FIG. 1 generally illustrates a conventional system for performing data transactions.

FIG. 1 generally illustrates a conventional system 100 for performing data transactions. The system 100 includes a processor 110 and a local bus 120 that couples the processor 110 to a simple bus controller 101 and an arbiter 130.

The simple bus controller 101 may include configuration and status registers (CSR) 150, a transaction counter and ID generator (TC/IDG) 170, an address counter 172, and a response queue 180. The CSR 150 may be coupled to the processor 110 via the local bus 120. The processor 110 may write to the CSR 150 in order to trigger a bus burst. The CSR 150 may send a DMA command along a DMA command path 157 to the TC/IDG 170.

In response to the DMA command, the TC/IDG 170 may assign a TID and notify the CSR 150 of the assigned TID via a TID/error control path 175. The system bus 190 may support out-of-order completion and may return the TID of a completed transaction. The same TID is used here to let the processor 110 match the completed command to the DMA command, so the TID is simultaneously sent on the system bus 190 and returned to the processor 110. The TC/IDG 170 may send an address, for example, a local address, to the address counter 172 along an address path 171. The TID may link each transaction to a particular local address and a particular remote address. When the processor 110 gets the TID, it knows that data was copied from/to the local address to/from the remote address, so it can recycle the local buffer (in case of write) or access the data (in case of read). The address counter 172 may then provide the address to the arbiter 130. The address may correspond to a source address and/or a destination address. The TC/IDG 170 may also send a bus command to a system bus 190 via a bus command control path 179. The bus command may be a command that the system bus 190 assist in a data transaction and may include the TID associated with the requested data transaction.

The arbiter 130 may be coupled to a tightly-coupled memory (TCM) 140 and the system bus 190. The arbiter 130 may receive an address from the local bus 120 via a processor address path 113 or from the address counter 172 via an address counter address control path 173. The TCM 140 may be accessed either from the processor 110 or from the address counter 172. During a DMA operation, the address counter 172 provides a local address that matches the data sent/received to/form the system bus 190 based on the DMA command issued from the processor 110. The processor 110 also accesses the TCM 140 directly to load or store data to/from its internal registers.

The arbiter 130 may exchange data with the local bus 120 via a processor data path 131. The arbiter 130 may also send an address to the TCM 140 via a TCM address path 134 and exchange data with the TCM 140 via a TCM data path 143. The arbiter 130 may also exchange data with the system bus 190 via a bus data path 139.

The response queue 180 may receive a bus response from the system bus 190 via a bus response control path 198. The bus response may include the TID of the recently-completed data transaction. The response queue 180 may notify the CSR 150, via a response queue control path 185, of the TID of the completed data transaction. The response queue 180 may also send an interrupt signal 181 to the processor 110. In response to receipt of the interrupt signal 181, the processor 110 may read the response queue 180 (for example, via the CSR 150) to determine the TID of the completed data transaction. As a result, the processor 110 may infer that the data associated with the TID has been provided to the TCM 140, where it is easily accessible to the processor 110 via the arbiter 130. The processor 110 may then use the data in the TCM 140 to perform additional processing tasks.

In one example of the operations of the system 100, suppose that the processor 110 triggers a data transaction wherein data is retrieved from a memory device (not shown in FIG. 1, but coupled to the system 100 via the system bus 190) and stored in the TCM 140 for easy access by the processor 110. The memory device may be, for example, Static Random Access Memory (SRAM), Double Data Rate Synchronous Dynamic Random Access Memory (DDR SDRAM), or NOR flash memory. The processor 110 may specify a source address value, a destination address value, and/or a length value associated with the length of the data to be transacted (for example, each of the source address, destination address, and length). In this case (i.e., a read transaction), the source address may be a system address associated with the memory device and the destination address may be a local address associated with the TCM 140. In other cases (for example, in write transactions), the source address may be a local address associated with the TCM 140 and the destination address may be a system address associated with the memory device.

The processor 110 triggers the data transaction by writing the source address value, the destination address value, and/or the length value to the CSR 150. The CSR 150 may generate a DMA command based on the values and send the DMA command to the TC/IDG 170. The TC/IDG 170 may send a bus command via the bus command control path 179 to the system bus 190 and a source address, destination address, or any other suitable address to the arbiter 130 via the address counter 172. The bus command sent to the system bus 190 may include a plurality of fields, for example, a system address value, a length value, a TID value, and/or a read/write indication. The address sent to the arbiter 130 may initialize as a local address value, and may increment with every cycle of the system bus 190. The DMA operation may trigger a bus burst that may include multiple data cycles. Hence, the local address needs to increment with every data beat. Otherwise it will just overwrite previous data or send the same data over again. The system bus 190 may retrieve the requested data from the memory device using, for example, the source address value and/or the length value provided in the bus command received via the bus command control path 179. The retrieved data may be provided to the arbiter 130 via the bus data path 139. The arbiter 130 may write the data received from the system bus 190 to the TCM 140 in accordance with the destination address value. Once stored in the TCM 140, the data is easily accessible to the processor 110. Moreover, the processor 110 may be notified, via the response queue 180, that the data is accessible in the TCM 140.

The simple bus controller 101 depicted in FIG. 1 may be controlled using software that is executed by the processor 110. For example, the processor 110 (and/or the TCM 140) may perform processing to ensure that it only requests data transactions that can be readily performed in a single address/control cycle and one or more data cycles of the system bus 190. The processor 110 (and/or the TCM 140) may also maintain a record of requested data transactions. However, as noted above, execution of these tasks using software consumes the processing resources of the processor 110. Moreover, the processor 110 needs to store data relating to the limitations of the system bus 190 so that code cannot be binary-compatible across varying system bus constraints. Accordingly, new techniques for handling large data exchanges are needed. These new techniques should improve on the processing consumption associated with a software approach, while simultaneously avoiding the high costs associated with hardware acceleration.

Figure 2:
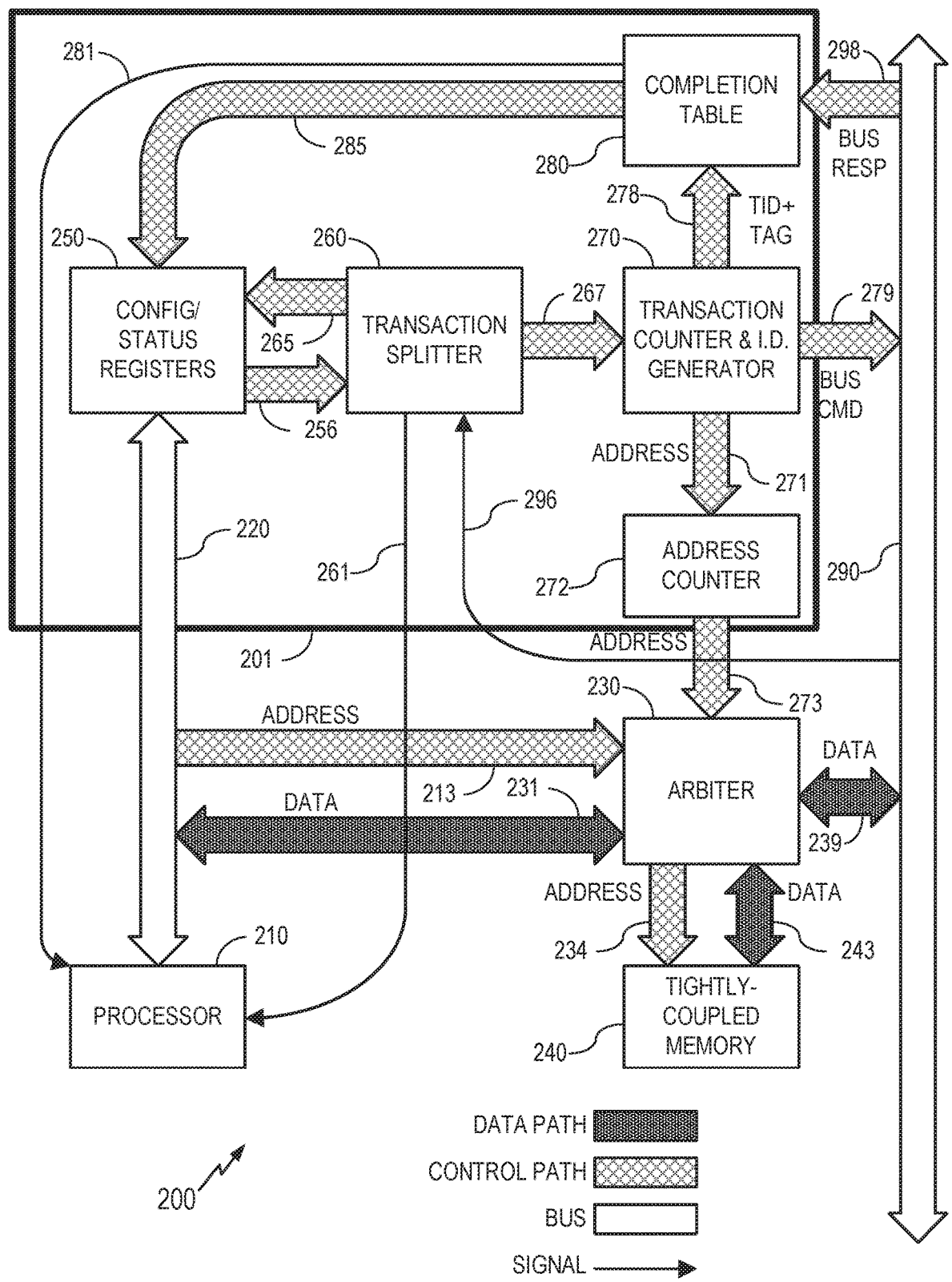
FIG. 2 generally illustrates a system for performing a data exchange in accordance with aspects of the disclosure.

FIG. 2 generally illustrates a system 200 for performing a data exchange in accordance with aspects of the disclosure.

The components depicted in FIG. 2 may be analogous in some respects to the components depicted in FIG. 1. Accordingly, only the differences between the components depicted in FIG. 2 and the components depicted in FIG. 1 will be described.

The system 200 includes a processor 210, a bus controller 201, a local bus 220, an arbiter 230, a TCM 240, and a system bus 290. These components may be analogous to the processor 110, the simple bus controller 101, the local bus 120, the arbiter 130, the TCM 140, and the system bus 190 depicted in FIG. 1, respectively. Moreover, the data paths and control paths associated with the processor 210, the local bus 220, the arbiter 230, the TCM 240, and the system bus 290 may be analogous to the data paths and control paths depicted in FIG. 1. In particular, the system 200 may include a processor address path 213 analogous to the processor address path 113, a processor data path 231 analogous to the processor data path 131, a TCM address path 234 analogous to the TCM address path 134, a TCM data path 243 analogous to the TCM data path 143, and a bus data path 239 analogous to the bus data path 139.

The bus controller 201 may include a CSR 250, a TC/IDG 270, an address path 271, an address counter 272, and an address counter address control path 273. These components may be analogous to the CSR 150, the TC/IDG 170, the address path 171, the address counter 172, and the address counter address control path 173 depicted in FIG. 1.

The differences between the components depicted in FIG. 2 and the components depicted in FIG. 1 will be described in greater detail below.

Like the processor 110, the processor 210 may provide the CSR 250 with a source address value, a destination address value, and/or a length value. Unlike the processor 110, the processor 210 may further provide the CSR 250 with a data exchange tag identifying the requested data exchange.

Unlike the simple bus controller 101, the bus controller 201 may include a transaction splitter 260 that is provided between the CSR 250 and the TC/IDG 270. The transaction splitter 260 may receive a DMA command from the CSR 250 via a DMA control path 256. The DMA command may include the data exchange tag that was provided by the processor 210.

The transaction splitter 260 may determine, based on a set of known constraints associated with the system bus 290, whether the data exchange specified in the DMA command should be split into a plurality of fractional data transactions. Examples of bus constraints include a maximal burst constraint, a page-crossing constraint, and an alignment constraint.

A maximal burst constraint is a rule that a single data transaction may not have a length that exceeds a maximal burst threshold value. For example, in a system with a system bus having a width of eight bytes, the maximal burst may be one hundred and twenty-eight bytes, equating to sixteen data beats on the eight-byte system bus. If the amount of data associated with the requested data exchange exceeds the maximal burst threshold value, then the transaction splitter 260 may determine that the requested data exchange should be split into fractional data transactions wherein each fractional data transaction has sixty-four bits or less.

A page-crossing constraint is a rule that a single data transaction may include data that is entirely within a first page of memory or data that is entirely within a second page of memory, but may not include data that is partially in the first page and partially in the second page. As an example, suppose that the requested data has sixteen bits on the first page and one hundred bits on the second page. The transaction splitter 260 may determine that the requested data exchange should be split into a first fractional data transaction with a length of sixteen bits (specifying the data on the first page) and a second fractional data transaction with a length of one hundred bits (specifying the data on the second page).

An alignment constraint is a rule that in order to achieve a maximal length of the data transaction, the data in a single data transaction must be aligned with the system bus 290.

For example, consider a system with an eight-byte system bus width and an upper limit of sixteen cycles per burst. In this example, the maximal length of the transaction would be one-hundred and twenty-eight bytes (i.e., eight bytes time sixteen cycles). If a data transaction is offset by four bytes, the maximal length of the data transaction may be one hundred twenty-four bytes, rather than one hundred twenty-eight bytes. In this example, the transaction splitter 260 may determine that the requested data exchange should be split such that any fractional data transaction of a certain length begins at an aligned address.

Other bus constraints may be possible, but descriptions thereof will be omitted for brevity.

In response to a determination that the data exchange specified in the DMA command should be split into fractional data transactions, the transaction splitter 260 depicted in FIG. 2 may perform the splitting such that each of the fractional data transactions can be completed while conforming to one or more of the foregoing bus constraints. After performing the splitting, the transaction splitter 260 may send a plurality of fractional DMA commands (corresponding to the plurality of fractional data transactions) to the TC/IDG 270 along the fractional DMA command control path 267. The transaction splitter 260 may also send a status/remainder notification to the CSR 250 via a status/remainder control path 265.

The status/remainder value provided along the status/remainder control path 265 is a set of values (for example, a system address value, a local address value, and a length value) representing a data transaction that the bus controller 201 is unable to request from the system bus 290 due to bus congestion. Unlike the system 100, the system 200 includes a bus controller 201 that notifies the processor 210 of bus congestion and thereby limits stalling of the processor 210. The bus controller 201 provides the status/remainder value to the CSR 250, which can be read by the processor 210. Once the CSR 250 has been updated based on the status/remainder value, the processor 210 can perform other tasks until congestion is relieved, at which point the processor 210 may re-arbitrate the remainder with other data transactions and resume if/when the remainder wins arbitration. The re-arbitrating may be performed using software.

Like the TC/IDG 170, the TC/IDG 270 may assign TIDs, issue bus commands to the system bus 290 via a bus command control path 279, and specify addresses to the address counter 272. Unlike the TC/IDG 170, the TC/IDG 270 may act on fractional DMA commands sent by the transaction splitter 260 (rather than, for example, a command analogous to the DMA command sent by the CSR 150 depicted in FIG. 1). For each data transaction accepted by the system bus 290, the TC/IDG 270 may assign a TID based on the fractional DMA commands received from the transaction splitter 260. The TC/IDG 270 may provide the TID corresponding to each fractional data transaction to a completion table 280 via the TID/tag control path 278. The TC/IDG 270 may also provide the completion table 280 with the data exchange tag provided by the processor 210. The completion table 280 may store the TID of each fractional data transaction such that it is linked in storage to the data exchange tag with which the fractional data transaction is associated. The completion table 280 may also set a completion status of each TID to 'incomplete' (wherein 'incomplete' is represented by, for example, a zero). An implementation example of the completion table 280 is depicted in FIG. 5, as will be discussed in greater detail below.

Like the response queue 180, the completion table 280 may receive a bus response from the system bus 290 via a bus response control path 298. The bus response may include the TID of a recently-completed data transaction. The completion table 280 may notify the CSR 250, via a response queue control path 285, of one or more recently-completed data transactions. In accordance with aspects of the disclosure, the completion table 280 may avoid unnecessary notifications and interrupts to the processor 110 by waiting until all TIDs for a particular data exchange are complete. Unlike the response queue 180 (which provides the processor 110 with the interrupt signal 181 in response to each receiving of a bus response), the completion table 280 may provide the processor 210 with a completion table interrupt signal 281 only after every TID associated with a particular data exchange tag is complete.

The transaction splitter 260 may be further configured to assess bus congestion based on, for example, a bus congestion signal 296. Based on the assessment, the transaction splitter 260 may, for example, notify the processor 210 of acceptance by sending a remainder value of zero along the status/remainder control path 265 and may notify the processor 210 that the system bus 290 is congested at least in part by sending a non-zero remainder along the status/remainder control path 265. In the event that bus congestion is relieved, then the transaction splitter 260 may notify the processor 210 by sending a splitter interrupt signal 261. Accordingly, the processor 210 can resume transactions or issue new transactions.

Figure 3:
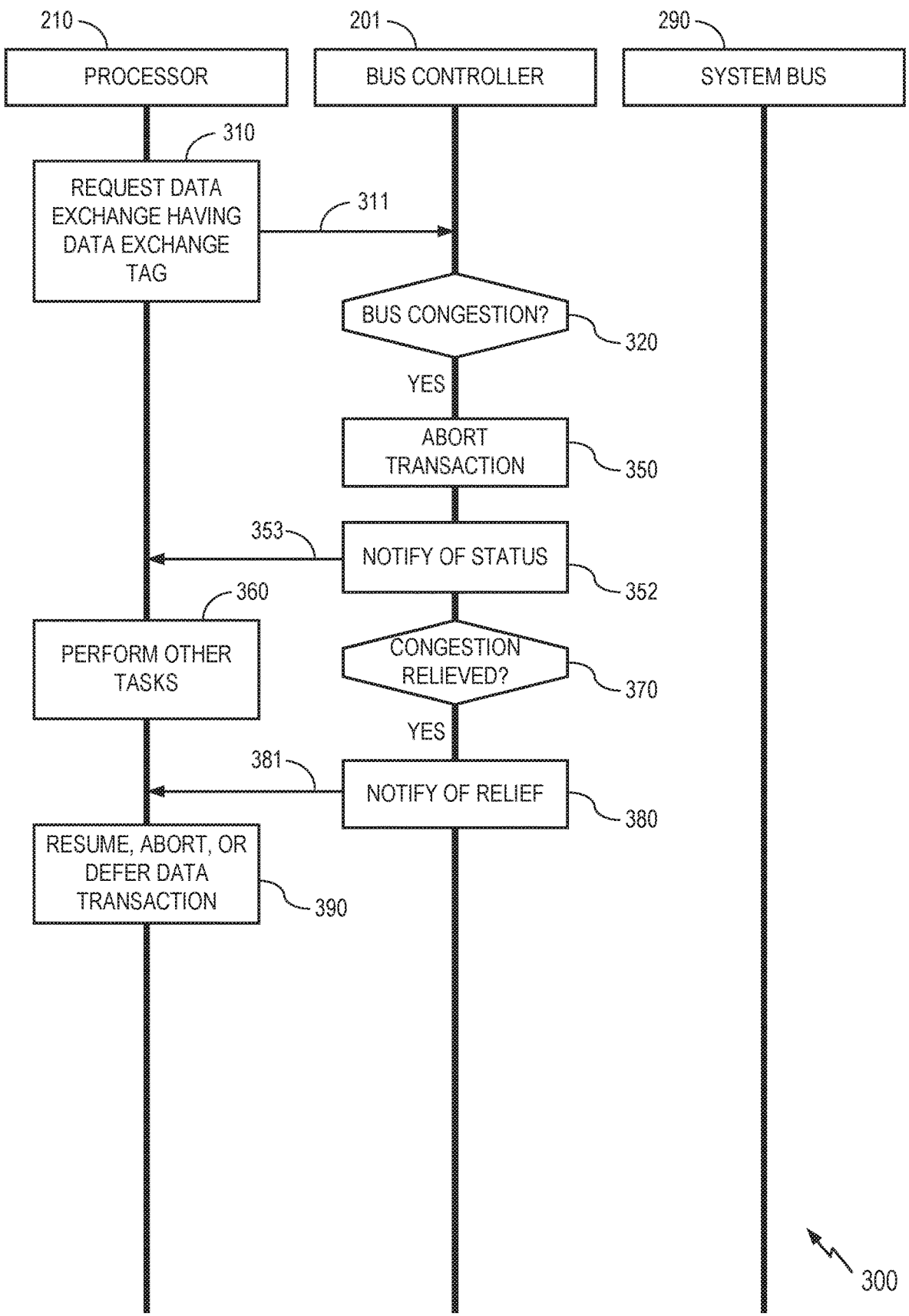
FIG. 3 generally illustrates a signal flow diagram relating to a scenario where the system bus depicted in FIG. 2 is congested.
Figure 4:
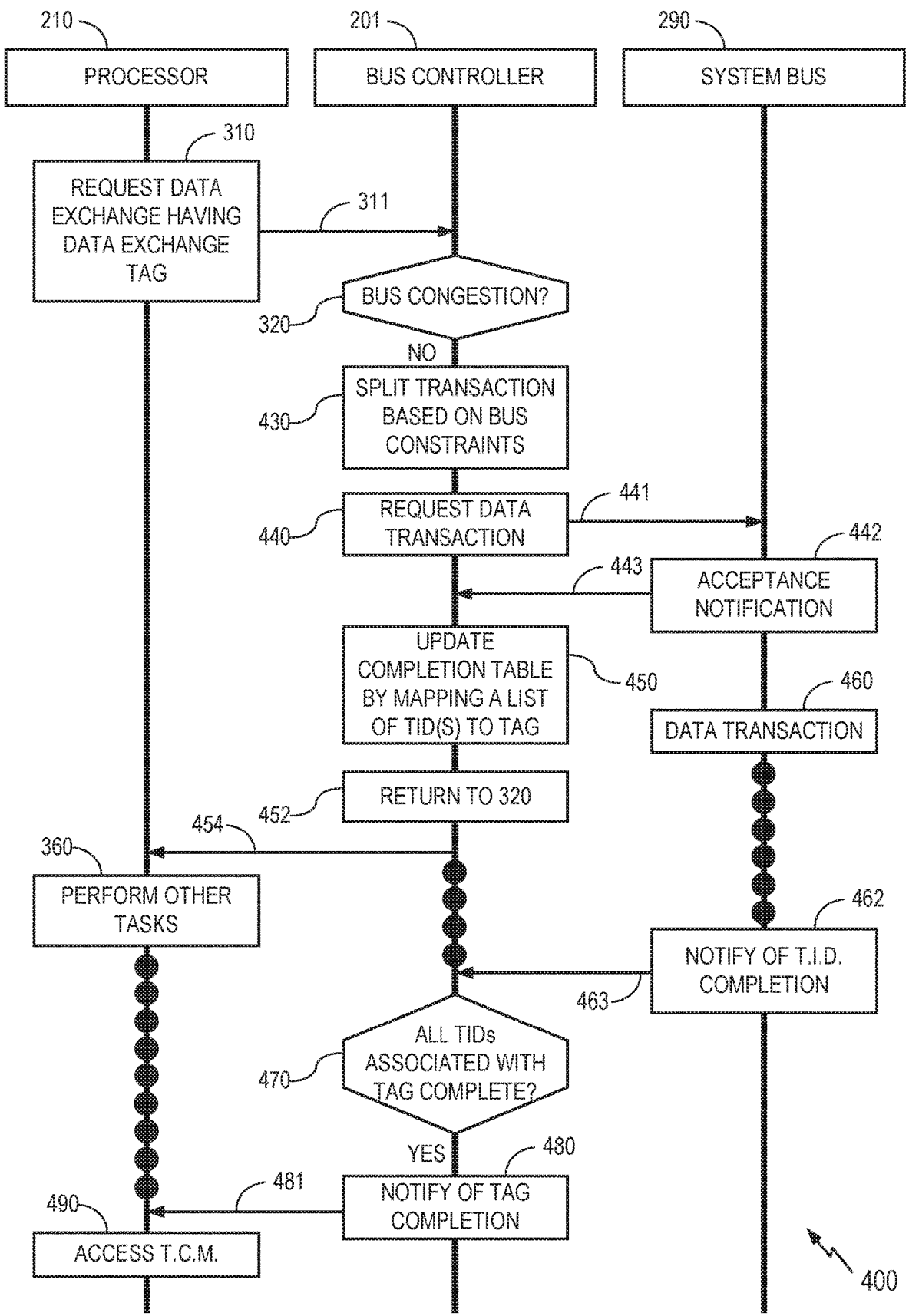
FIG. 4 generally illustrates another signal flow diagram relating to a scenario where the system bus depicted in FIG. 2 is not congested.

FIGS. 3-4 generally illustrate signal flow diagrams 300, 400, respectively, relating to a first scenario in which the system bus 290 is determined to be congested (FIG. 3), and a second scenario in which the system bus 290 is determined to be not congested (FIG. 4). FIGS. 3-4 depict examples of signal exchanges between various components of the system 200, including the processor 210, the bus controller 201, and the system bus 290.

At 310, the processor 210 may provide the bus controller 201 with a data exchange request 311 having a data exchange tag. The data exchange request 311 may include a source address value, a destination address value, a length value, or any combination thereof. In particular, the processor 210 may write one or more of these values to the CSR 250 (a component of the bus controller 201) via the local bus 220. The data exchange request 311 may also include a data exchange tag for uniquely identifying the requested data exchange.

In the system 100, the processor 110 may only request data transactions that conform to the bus constraints of the system bus 190. By contrast, the data exchange request 311 need not conform to any bus constraints associated with the system bus 290. Accordingly, the amount of processing performed by the processor 210 is reduced.

At 320, the bus controller 201 determines that the system bus 290 is congested or that congestion is imminent ('yes' at 320). The determining at 320 may be performed by, for example, the transaction splitter 260. The determination that the system bus 290 is congested or that congestion is imminent may be based on any suitable indicator.

For example, in a first implementation, the determining at 320 may be based on the bus congestion signal 296. In this implementation, the system bus 290 may explicitly indicate that it is congested, explicitly indicate that it is not congested, or a combination thereof. If the system bus 290 indicates that it is congested, then the transaction splitter 260 determines at 320 that the system bus 290 is congested.

In a second implementation, the determining at 320 is based on a sideband congestion indication generated using system bus statistics. If the system bus statistics indicate that the system bus 290 is congested, then the transaction splitter 260 determines at 320 that the system bus 290 is congested.

In a third implementation, the determining at 320 is based on congestion avoidance techniques. Congestion avoidance techniques may be based on an amount of outstanding data (AOD) limit and/or a number of outstanding transactions (NOT) limit. The AOD limit may be a threshold amount of data associated with outstanding data requests. For example, if the AOD limit is sixty-four bytes, and the total amount of outstanding data exceeds sixty-four bytes, then the transaction splitter 260 may determine at 320 that the system bus 290 is congested. Additionally or alternatively, if the NOT limit is eight transactions, and the number of outstanding transactions exceeds eight transactions, then the transaction splitter 260 may determine at 320 that the system bus 290 is congested. It will be understood that the transaction splitter 260 may take action to avoid congestion, i.e., action that will ensure that the system bus 290 never becomes congested. In particular, the transaction splitter 260 may be configured to determine that commencement of an additional data transaction would put the amount of outstanding data over the AOD limit, thereby causing imminent congestion. The transaction splitter 260 may then abort the transaction in order to avoid the imminent congestion (as will be discussed in greater detail below), and then determine that the system bus 290 is congested based on the determination that the system bus 290 cannot currently accommodate any additional data transactions. Likewise, the transaction splitter 260 may be configured to determine that an additional data transaction would put the number of outstanding transactions over the NOT limit, and then characterize the system bus 290 as congested based on the determination. The AOD limit may be advantageously employed to avoid congestion in a scenario where the data transactions pass through a bandwidth-limited link of known bandwidth (for example, a Peripheral Component Interconnect Express, or PCIe). The NOT limit may be advantageously employed to avoid congestion in a scenario where there is a known reservation in the system bus 290 that guarantees it will not block if outstanding transactions are below a certain number.

As noted above, FIG. 3 depicts a scenario where the system bus 290 is determined at 320 to be congested ('yes' at 320). FIG. 4, by contrast, depicts a scenario where the system bus 290 is determined at 320 to be not congested ('no' at 320), as will be discussed in greater detail later in the present disclosure.

At 350, in response to the determination that the system bus 290 is congested ('yes' at 320, as depicted in FIG. 3), the bus controller 201 may abort the data transaction. The aborting at 350 may be performed by, for example, the transaction splitter 260 and/or the TC/IDG 270, which may, for example, cease sending commands that trigger additional data transactions.

At 352, the bus controller 201 may notify the processor 210 of a status of the system bus 290. In particular, the bus controller 201 may send a status notification 353 to the processor 210 indicating that the system bus 290 is congested. The sending of the status notification 353 may be performed by signaling a status/remainder value to the CSR 250 via the status/remainder control path 265 (from where the processor 210 can read the signal). As noted above, if the status/remainder value is non-zero, this may indicate to the processor 210 that the system bus 290 is congested.

In some implementations, the status notification 353 may indicate an extent to which the requested data exchange has been completed. For example, the status notification 353 may indicate that none of the requested data was successfully exchanged or that part of the requested data was exchanged. As another example, the status notification 353 may indicate a percentage of the requested data that was successfully exchanged prior to determining at 320 that the system bus 290 was congested. For example, suppose that the data exchange request provided by the processor 210 specified thirty-two bytes of data, and the transaction splitter 260 splits the requested data such that it is exchanged in four different eight-byte fractional data transactions. If the system bus 290 is initially determined to be not congested, then the first eight-byte fractional data transaction may be completed successfully. However, if the system bus 290 subsequently becomes congested (for example, if the second eight-byte fractional data transaction is not accepted by the system bus 290), then the second eight-byte fractional data transaction may be aborted at 350. Accordingly, the status notification 353 may indicate that twenty-five percent of the requested data exchange has been completed, but that attempts to exchange the remaining seventy-five percent are on hold.

At 360, in response to receipt of the status notification 353, the processor 210 performs other tasks. The status notification 353 informs the processor 210 that the requested data cannot be completed immediately due to congestion of the system bus 290. Accordingly, the processor 210 may go on to perform other tasks while waiting for completion of the requested data exchange. The other tasks may include one or more tasks that are not contingent upon successful completion of the outstanding data exchange.

Meanwhile, at 370, the bus controller 201 may continue to monitor the system bus 290 to determine whether the congestion of the system bus 290 has been relieved. Identification of bus congestion (or lack thereof) at 370 may be performed in the same manner as the determining at 320.

At 380, in response to a determination that the congestion has been relieved ('yes' at 370), the bus controller 201 may notify the processor 210 of the congestion relief by sending a relief notification 381. The relief notification 381 may be sent via the splitter interrupt signal 261 depicted in FIG. 2.

At 390, in response to receipt of the relief notification 381, the processor 210 may resume, abort, or defer the requested data exchange.

Turning now to FIG. 4, it will be understood that the initial actions depicted in the signal flow diagram 400 are analogous to the initial actions depicted in the signal flow diagram 300. Accordingly, further description thereof will be omitted. In particular, the requesting at 310 and the determining at 320 are performed. The determining at 320 depicted in FIG. 4 may be performed in a manner that is analogous to the determining at 320 depicted in FIG. 3. However, the outcome of the determining at 320 depicted in FIG. 4 may be different from the outcome of the determining at 320 depicted in FIG. 3.

At 430, in response to a determination that the system bus 290 is not congested ('no' at 320, as depicted in FIG. 4), the bus controller 201 may split the requested data exchange into fractional data transactions based on bus constraints. The splitting at 430 may be performed by, for example, the transaction splitter 260. As noted above, all bus constraints must be met (for example, constraints relating to maximum burst, page-crossing, and/or alignment). In the scenario depicted in FIG. 4, it will be understood that there are bus constraints that necessitate the splitting of the requested data exchange. The splitting at 430 may be omitted if not necessitated by bus constraints.

At 440, the bus controller 201 requests that the system bus 290 perform a data transaction. Accordingly, the bus controller 201 may send a bus command 441 to the system bus 290 that is analogous to the bus command sent via the bus command control path 279 depicted in FIG. 2 (for example, indicating a system address value, a length value, a TID value, and/or a read/write indication).

At 442, in response to receipt of the bus command 441, the system bus 290 notifies the bus controller 201 that the requested data transaction is accepted. Accordingly, the system bus 290 may send an acceptance notification 443 to the bus controller 201.

At 450, the bus controller 201 may update the completion table 280 by mapping a list of one or more TIDs to the data exchange tag. The updating at 450 may be performed by, for example, the TC/IDG 270 and/or completion table 280. It will be understood that each newly-added TID may be linked in storage to its corresponding data exchange tag and initialized with an 'incomplete' status indicator. The updating at 450 may be performed in response to receipt of the acceptance notification 443.

At 452, the bus controller 201 may return to the determining at 320 in preparation for issuance of a next bus command 441 (for example, relating to a new fractional data transaction). The returning at 452 may continue until there are no more data transactions to be requested.

At 454, the bus controller 201 may send an acceptance notification to the processor 210 indicating that one or more data transactions have been accepted.

At 360, the processor 210 may perform other tasks in response to the acceptance notification 454 received from the bus controller 201 (analogous to the performing at 360 depicted in FIG. 3). As noted above, the performing of the other tasks at 360 may relate to one or more tasks that are not contingent upon successful completion of the outstanding data exchange.

Meanwhile, at 460, the system bus 290 performs each requested data transaction by exchanging data among various components of the electronic device. The performing at 460 may require some time to complete, during which the processor 210 is free to perform unrelated tasks.

At 462, after the requested data transaction is complete, the system bus 290 may notify the bus controller 201 that the data transaction associated with a particular TID has been completed. Accordingly, the system bus 290 may send a bus response signal 463 to the bus controller 201. The bus controller 201 may respond by updating the completion table 280. In particular, a completion status associated with the indicated TID may be changed from 'incomplete' to 'complete'. Each updating of the completion table 280 may trigger the bus controller 201 to proceed to 470.

At 470, the bus controller 201 determines whether all TIDs that are associated with a particular data exchange tag are complete. The determining at 470 may be performed by, for example, the completion table 280. The determining at 470 may be based on the completion statuses stored in the completion table 280. As noted above, the determining at 470 may be performed in response to receipt of the bus response signal 463.

At 480, in response to a determination that all TIDs associated with a particular data exchange tag are complete, the bus controller 201 notifies the processor 210 that the data exchange requested at 310 is complete. Accordingly, the bus controller 201 may send a tag completion notification 481 to the processor 210.

At 490, after receiving the tag completion notification 481, the processor 210 may perform one or more tasks that are contingent upon successful completion of the requested data exchange. For example, as shown in the exemplary signal flow diagram 400, the processor 210 may access the TCM 240 by performing a read function on the data associated with the recently-completed data exchange tag.

FIG. 5 generally illustrates an example implementation 500 of the completion table 280 depicted in FIG. 2. The example implementation 500 depicts a table populated with specific example values, as will be discussed in greater detail below.

The example implementation 500 may include a table having three columns, a TID column 501, a tag column 502, and a completion status column 503. The table may have a plurality of entries 550-558. The TID column 501 may include a plurality of unique TIDs corresponding respectively to the plurality of entries 550-558. Each of the plurality of entries 550-558 may further include a data exchange tag associated with the TID (stored in the tag column 502), and a completion status associated with the TID (stored in the completion status column 503).

In the example implementation 500, the data exchange tags are depicted as having one-byte values and the TIDs are depicted as having two-byte values, with the values represented in the example by hexadecimal values. The completion status is depicted as a single bit with the values represented in the example by binary values, wherein, for example, a zero indicates an 'incomplete' status and a one indicates a 'complete' status. In the example implementation 500, there are nine entries in the plurality of entries 550-558. It will be understood that these details are provided solely for illustration, and that the completion table 280 may be implemented as in the example implementation 500, or in any other suitable manner in accordance with aspects of the disclosure.

As noted above, the transaction splitter 260 receives from the processor 210 a data exchange tag for identifying a requested data exchange. If the transaction splitter 260 determines that the requested data exchange needs to be split, then it will split the requested data exchange into a plurality of fractional data transactions. For each data transaction that is accepted by the system bus 290, the TC/IDG 270 will assign a TID and forward each TID and the associated data exchange tag to the completion table 280. The TID may be initialized with an 'incomplete' status, represented in FIG. 5 by a zero in the completion status column 503.

In the example implementation 500, the first entry 550 has a TID of '0000' and a data exchange tag of '00'. Notably, there is only one instance of '00' in the tag column 502. It will be understood that the requested data exchange associated with the data exchange tag '00' did not require splitting, and was therefore assigned a single unique TID ('0000'). By contrast, the entries 551-552 (associated with TIDs '0001' and '0002', respectively) are associated with the same data exchange tag '01'. Because there are two instances of the data exchange tag '01', it will be understood that bus constraints necessitated the splitting (into two) of the data exchange associated with the data exchange tag '01'. Further details will be omitted, but it can be understood from FIG. 5 that there are two entries 553-554 associated with the data exchange tag '02', and four entries 555-558 associated with the data exchange tag '03'. In the example implementation 500, the completion statuses in the completion status column 503 show several TIDs being marked complete (in particular, '0000'-'0003') and the remaining TIDs being marked incomplete. It will be understood that each entry in the completion table 280 represents a TID of a data transaction that has been accepted by the system bus 290.

From the values in the tag column 502 and the completion status column 503, the bus controller 201 may determine whether all TIDs that are associated with a particular data exchange tag are complete (as at the determining 470 depicted in FIG. 4). In the example implementation 500, it may be observed that every TID associated with the data exchange tag '00' is complete, every TID associated with the data exchange tag '01' is complete, that a fraction of the TIDs associated with the data exchange tag '02' are complete, and that none of the TIDs associated with the data exchange tag '03' are complete.

Returning to the signal flow diagram 400 of FIG. 4, consider how the completion table 280 may come to include the example values depicted in FIG. 5. For example, suppose that the bus controller 201 receives four data exchange requests from the processor 210, associated with the data exchange tags '00', '01', '02', and '03'.

The transaction splitter 260 may determine that the first requested data exchange ('00') does not need to be split. The transaction splitter 260 may then issue a DMA command via the fractional DMA command control path 267 to the TC/IDG 270. The DMA command may trigger the TC/IDG 270 to send a bus command to the system bus 290, and in the event of acceptance by the system bus 290, assign a TID ('0000') and provide the TID to the completion table 280.

Next, the transaction splitter 260 may determine that the second requested data exchange ('01') needs to be split into two fractional data transactions. The transaction splitter 260 may then issue a first DMA command associated with a first fractional data transaction to the TC/IDG 270. The first DMA command may trigger the TC/IDG 270 to send a bus command to the system bus 290. Upon acceptance by the system bus 290, the TC/IDG 270 may assign a TID ('0001') and provide the TID to the completion table 280. The transaction splitter 260 may issue a second DMA command associated with a second fractional data transaction. Upon acceptance by the system bus 290, the TC/IDG 270 may assign a TID ('0002') and provide the TID to the completion table 280.

Next, the transaction splitter 260 may determine that the third requested data exchange ('02') also needs to be split into two fractional data transactions. Using the same process as described in the previous paragraph, the transaction splitter 260 may (upon acceptance by the system bus 290) assign TIDs '0003' and '0004'.

As the transaction splitter 260 processes the aforementioned requested data exchanges, the system bus 290 may intermittently provide a bus response notifying the completion table 280 that a data transaction associated with a particular TID has been completed. In the example of FIG. 5, it will be understood that bus responses corresponding to TIDs '0000', '0001', '0002', and '0003' have been received by the completion table 280. When the TID '0000' is completed, the bus controller 201 may notify the processor 210 that the first requested data exchange is complete. This may be accomplished by sending a remainder value of zero to the CSR 250. When the TIDs '0001' and '0002' are both completed, the bus controller 201 may notify the processor 210 that the second requested data exchange is complete. This may also be accomplished by sending a remainder value of zero to the CSR 250.

In accordance with the present example, suppose further that the transaction splitter 260 determines that the fourth requested data exchange ('03') must be split into ten fractional data transactions. Suppose further that the system bus 290 becomes congested (or is subject to imminent congestion) after four of the ten fractional data transactions have been accepted by the system bus 290.

Using the same process as described in the previous paragraph, the transaction splitter 260 may (upon acceptance by the system bus 290) assign TIDs '0005', '0006', '0007', and '0008' to the first four fractional data transactions. However, in this example, the bus controller 201 then determines that the system bus 290 is congested (or is in danger of imminent congestion). In the absence of congestion, the remaining fractional data transactions would have been assigned TIDs '0009'-'000e' and the completion table 280 would have been updated to record the assigned TIDs. However, in the present example, these data transactions are aborted by the bus controller 201 upon determining that the system bus 290 is congested (or is in danger of imminent congestion). The bus controller 201 may also notify the processor 210 that the system bus 290 is congested. This may be accomplished by, for example, sending a remainder value of six, or alternatively, sixty percent to the CSR 250.

By consulting the CSR 250, the processor 210 may determine that the first and second requested data exchanges ('00' and '01') are accepted and completed. Accordingly, the processor 210 may perform any tasks that are contingent upon completion of the first and second requested data exchanges.

Using a similar method, the processor 210 may further determine that the third requested data exchange ('02') is accepted but incomplete. Accordingly, the processor 210 may perform any tasks that are not contingent upon completion of the third requested data exchange, but may continue to monitor signaling from the bus controller 201.

With respect to the fourth requested data exchange ('03'), the processor 210 may determine that the system bus 290 became congested prior to acceptance of each of the one or more data transactions associated with the fourth requested data exchange. Because the processor 210 has been notified that the system bus 290 is congested, the processor 210 may cease monitoring of the status of the fourth requested data exchange in the CSR 250, and may perform other tasks that are not contingent upon completion of the fourth requested data exchange.

Figure 6:
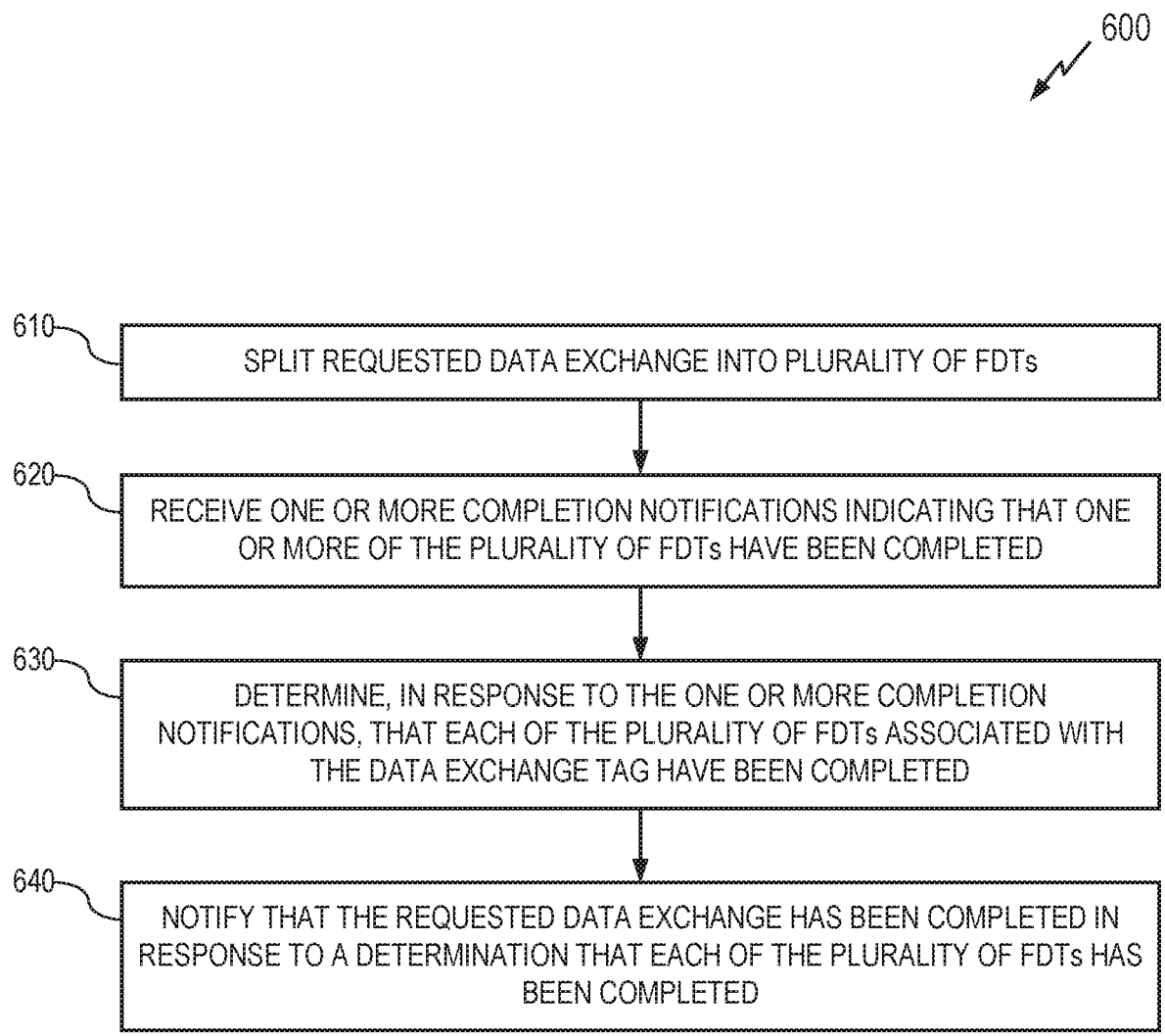
FIG. 6 generally illustrates a method for performing data exchanges in accordance with aspects of the disclosure.

FIG. 6 generally illustrates a method 600 for performing data exchanges in accordance with aspects of the disclosure. The method 600 may be performed by, for example, the system 200 and/or components thereof.

At 610, the method 600 splits a data exchange associated with a data exchange tag into a plurality of fractional data transactions. The data exchange may be identified in a data exchange request received from the processor 210. The received data exchange request may identify the data exchange using include the data exchange tag. The splitting 620 may be performed by, for example, the bus controller 201 and/or the transaction splitter 260 depicted in FIG. 2. Accordingly, the bus controller 201 and/or the transaction splitter 260 may constitute means for splitting the requested data exchange into a plurality of fractional data transactions.

In some implementations, the system 200 may optionally provide one or more bus commands to the system bus 290, wherein the one or more bus commands correspond to one or more of the plurality of fractional data transactions. Further, the system 200 may optionally receive one or more acceptance notifications indicating that the one or more fractional data transactions have been accepted by the system bus 290. Further, the system 200 may optionally assign TIDs corresponding to the one or more of the plurality of fractional data transactions and/or store the assigned TIDs associated with the one or more of the plurality of fractional data transactions, such that each assigned TID is linked in storage to the data exchange tag associated with the requested data exchange.

At 620, the method 600 receives one or more completion notifications indicating that one or more of the plurality of fractional data transactions have been completed. The receiving 660 may be performed by, for example, the processor 210, the bus controller 201, and/or the completion table 280 depicted in FIG. 2. Accordingly, the processor 210, the bus controller 201, and/or the completion table 280 may constitute means for receiving one or more completion notifications indicating that the one or more of the plurality of fractional data transactions have been completed.

At 630, the method 600 determines, in response to the one or more completion notifications, that each of the plurality of fractional data transactions associated with the data exchange tag have been completed. The determining 670 may be performed by, for example, the bus controller 201 and/or the completion table 280 depicted in FIG. 2. Accordingly, the bus controller 201 and/or the completion table 280 may constitute means for determining, in response to the one or more completion notifications, that each of the plurality of fractional data transactions associated with the data exchange tag have been completed.

At 640, the method 600 notifies the processor 210 that the requested data exchange has been completed in response to a determination at 670 that each of the plurality of fractional data transactions has been completed. The notifying 680 may be performed by, for example, the bus controller 201 and/or the completion table 280 depicted in FIG. 2. Accordingly, the bus controller 201 and/or the completion table 280 may constitute means for notifying a processor that the requested data exchange has been completed in response to a determination that each of the plurality of fractional data transactions has been completed.

The functionalities depicted in FIG. 6 may be implemented in various ways consistent with the teachings herein. In some designs, the functionality may be implemented as one or more electrical components. In some designs, the functionality may be implemented as a processing system including one or more processor components. In some designs, the functionality may be implemented using, for example, at least a portion of one or more integrated circuits (e.g., an ASIC). As discussed herein, an integrated circuit may include a processor, software, other related components, or any combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the functionalities depicted in FIG. 6, as well as other components and functions described herein, may be implemented using any suitable means. Such means also may be implemented, at least in part, using corresponding structure as taught herein. The components described above may also correspond to similarly designated "code for" functionality. Thus, in some aspects one or more of such means may be implemented using one or more of processor components, integrated circuits, or other suitable structure as taught herein.

Figure 7:
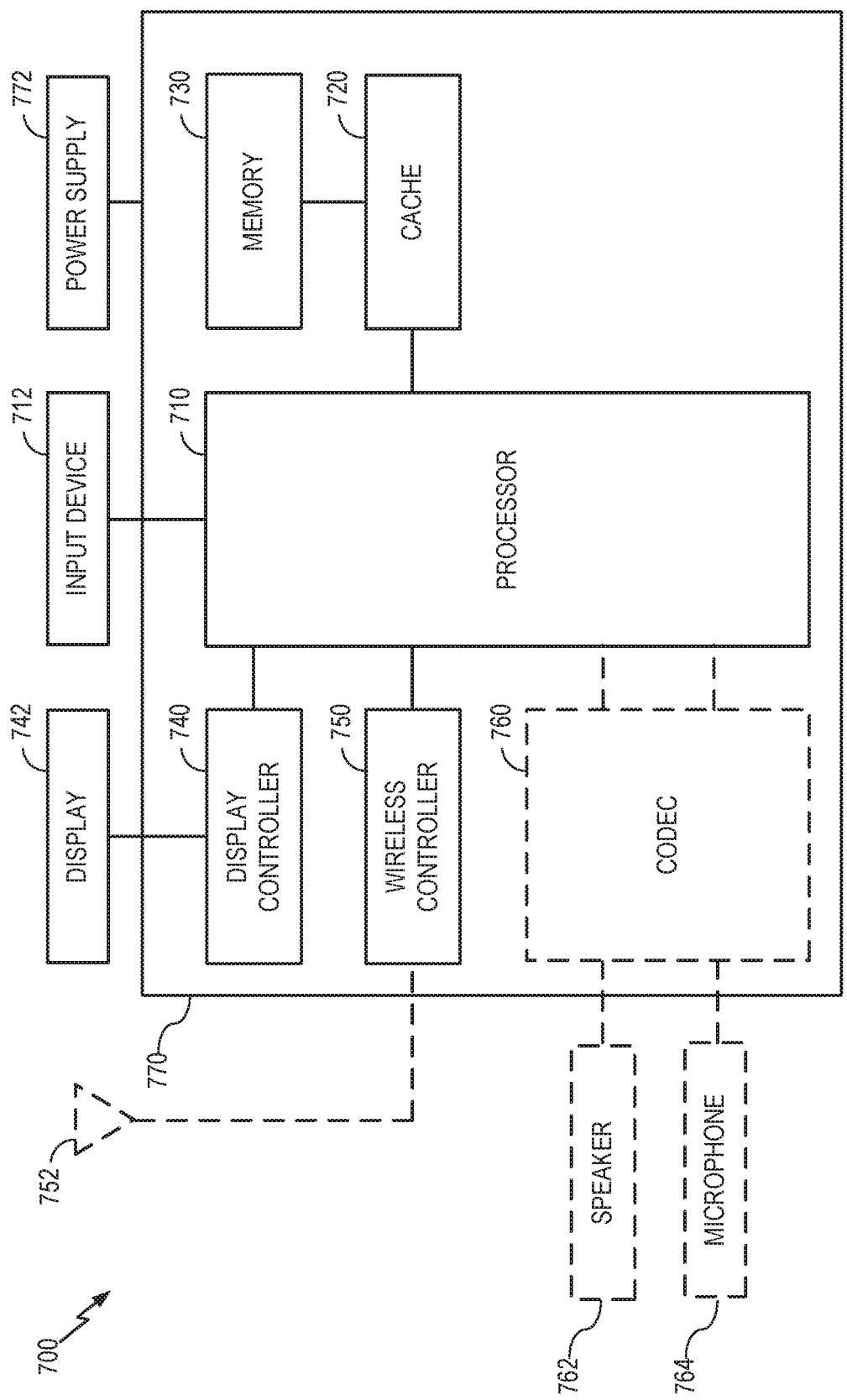
FIG. 7 generally illustrates an exemplary electronic device in which an aspect of the disclosure may be advantageously employed.

FIG. 7 generally illustrates an exemplary electronic device 700 in which an aspect of the disclosure may be advantageously employed.

Electronic device 700 may incorporate the system 200 depicted in FIG. 2 and/or a system configured to perform the method 600 depicted in FIG. 6. In the depiction of FIG. 7, electronic device 700 is shown to include a processor 710 that may be analogous to the processor 210 depicted in FIG. 2. Electronic device 700 may further comprise a cache 720. In FIG. 7, processor 710 is exemplarily shown to be coupled to memory 730 with cache 720 between processor 710 and memory 730, but it will be understood that other memory configurations known in the art may also be supported by electronic device 700.

FIG. 7 also depicts a display controller 740 that is coupled to processor 710 and to display 742. In some cases, electronic device 700 may be used for wireless communication. FIG. 7 depicts optional blocks in dashed lines, such as coder/decoder (CODEC) 760 (e.g., an audio and/or voice CODEC) coupled to processor 710. A speaker 762 and a microphone 764 may also be coupled to CODEC 760. Moreover, a wireless antenna 752 may be coupled to a wireless controller 750 which is coupled to processor 710. Where one or more of these optional blocks are present, in a particular aspect, processor 710, display controller 740, memory 730, and wireless controller 750 are included in a system-in-package or system-on-chip device 770.

Accordingly, a particular aspect, an input device 712 and a power supply 772 are coupled to the system-on-chip device 770. Moreover, in a particular aspect, as illustrated in FIG. 7, where one or more optional blocks are present, display 742, input device 712, speaker 762, microphone 764, wireless antenna 752, and power supply 772 are external to the system-on-chip device 770. However, each of display 742, input device 712, speaker 762, microphone 764, wireless antenna 752, and power supply 772 can be coupled to a component of the system-on-chip device 770, such as an interface or a controller. In some implementations, one or more of the components of the electronic device 700 may communicate with one another via a system bus analogous to the system bus 290 depicted in FIG. 2.

It should be noted that although FIG. 7 generally depicts a generic electronic device 700, one or more of the components of the electronic device 700 may additionally or alternatively be integrated into a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for bus control. Accordingly, the invention is not limited to illustrated examples and any means for performing the functionality described herein are included in aspects of the invention.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the apparatus claims in accordance with the aspects of the disclosure described herein need not be performed in any particular order. Furthermore, although certain aspects may be described or claimed in the singular, the plural is contemplated unless limitation to the singular is explicitly stated.

It will be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements".

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

It will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. The term "exchange" may refer to one or more data transfers from one component to another. For example, with respect to a particular component, exchanging functionality may be constituted by sending functionality, receiving functionality, or any combination thereof.

What is claimed is:
1. A method, comprising:
    sending, by a processor to a bus controller, a data exchange request comprising a data exchange tag that uniquely identifies a data exchange;

splitting, at the bus controller, the data exchange indicated by the data exchange tag that uniquely identifies the data exchange into a plurality of fractional data transactions;
assigning unique transaction identifiers (TIDs) to each of the plurality of fractional data transactions different than the data exchange tag;
receiving, at the bus controller, one or more completion notifications indicating that one or more of the plurality of fractional data transactions have been completed;
determining, in response to the one or more completion notifications, that each of the plurality of fractional data transactions have been completed; and
notifying the processor that the data exchange has been completed in response to the determination that each of the plurality of fractional data transactions has been completed.

2. The method of claim 1, further comprising determining at the bus controller whether a system bus is congested or not congested.

3. The method of claim 2, wherein determining that the system bus is congested comprises:
determining that a number of outstanding data transactions is greater than a number of outstanding data transactions threshold;
determining that an amount of outstanding data is greater than an outstanding data amount threshold;
determining that system bus statistics indicate congestion; or
any combination thereof.

4. The method of claim 2, further comprising, in response to a determination that the system bus is congested:
aborting at least one of the plurality of fractional data transactions;
sending a status notification to the processor indicating an incomplete status of the requested data exchange, wherein the status notification indicates a remainder portion of the requested data exchange that has not been completed;
monitoring the system bus to determine whether the congestion of the system bus is relieved or not relieved; and
in response to a determination that the congestion of the system bus is relieved, providing a relief notification to the processor indicating that the congestion of the system bus is relieved.

5. The method of claim 4, further comprising, at the processor, performing other processing tasks in response to the status notification, wherein the other processing tasks are not contingent upon completion of the data exchange.

6. The method of claim 4, further comprising, at the processor, resuming, aborting, or deferring the data exchange in response to the relief notification.

7. The method of claim 1, wherein the splitting is performed in response to a determination that a system bus is not congested and the method further comprises:
transmitting, from the processor and to the bus controller, a data exchange request, wherein the data exchange request includes the data exchange tag;
receiving, at the processor, an acceptance notification from the bus controller indicating that the requested data exchange has been accepted; and
performing, at the processor, other processing tasks in response to the acceptance notification, wherein the other processing tasks are not contingent upon completion of the requested data exchange.

8. The method of claim 1, further comprising:
providing one or more bus commands to a system bus, wherein the one or more bus commands respectively correspond to one or more of the plurality of fractional data transactions; and
receiving, at the bus controller, one or more acceptance notifications indicating that the one or more of the plurality of fractional data transactions have been accepted by the system bus.

9. The method of claim 1, wherein the received one or more completion notifications include a TID completion notification indicating that a system bus has completed one or more data transactions of the plurality of fractional data transactions, and the method further comprises:
in response to the receiving of the TID completion notification, storing a status indicator indicating that the fractional data transaction associated with the TID is complete;
determining whether all TIDs associated with the data exchange tag are complete; and
in response to a determination that all TIDs associated with the data exchange tag are complete:
sending a tag completion notification to the processor; and
performing, at the processor, other processing tasks, wherein the other processing tasks are contingent upon completion of the data exchange.

10. The method of claim 1, wherein the method is performed in a device selected from the group consisting of a set top box, a music player, a video player, an entertainment unit, a navigation device, a personal digital assistant (PDA), a fixed location data unit, a computer, a laptop, a tablet, a communications device, and a mobile phone.

11. An electronic device, comprising memory configured to store data, instructions, or a combination thereof, a processor coupled to the memory, a bus controller coupled to the processor, and a system bus coupled to the bus controller, wherein the bus controller is configured to:
receive, from the processor, a data exchange request comprising a data exchange tag that uniquely identifies a data exchange;
split the data exchange indicated by the data exchange tag that uniquely identifies the data exchange into a plurality of fractional data transactions;
assign unique transaction identifiers (TIDs) to each of the plurality of fractional data transactions different than the data exchange tag;
receive one or more completion notifications indicating that one or more of the plurality of fractional data transactions have been completed;
determine, in response to the one or more completion notifications, that each of the plurality of fractional data transactions have been completed; and
notify the processor that the data exchange has been completed in response to the determination that each of the plurality of fractional data transactions has been completed.

12. The electronic device of claim 11, wherein the bus controller is further configured to determine whether the system bus is congested or not congested.

13. The electronic device of claim 12, wherein to determine whether the system bus is congested or not congested the bus controller is further configured to:
determine that a number of outstanding data transactions is greater than a number of outstanding data transactions threshold;

determine that an amount of outstanding data is greater than an outstanding data amount threshold;
determine that system bus statistics indicate congestion; or
any combination thereof.

14. The electronic device of claim 12, wherein, in response to determining that the system bus is congested, the bus controller is configured to:
abort at least one of the plurality of fractional data transactions;
send a status notification to the processor indicating an incomplete status of the requested data exchange, wherein the status notification indicates a remainder portion of the requested data exchange that has not been completed;
monitor the system bus to determine whether the congestion of the system bus is relieved or not relieved; and
in response to a determination that the congestion of the system bus is relieved, provide a relief notification to the processor indicating that the congestion of the system bus is relieved.

15. The electronic device of claim 14, wherein to send the status notification, the bus controller is configured to send a remainder notification indicating a portion of the requested data exchange that has not been completed.

16. The electronic device of claim 14, wherein the processor is further configured to perform other processing tasks in response to the status notification, wherein the other processing tasks are not contingent upon completion of the data exchange, and wherein the processor is further configured to resume, abort, or defer the data exchange in response to the relief notification.

17. The electronic device of claim 11, wherein:
the bus controller is further configured to split the requested data exchange in response to a determination that the system bus is not congested; and
the processor is further configured to:
transmit to the bus controller a data exchange request, wherein the data exchange request includes the data exchange tag;
receive an acceptance notification from the bus controller indicating that the requested data exchange has been accepted; and
perform other processing tasks in response to the acceptance notification, wherein the other processing tasks are not contingent upon completion of the requested data exchange.

18. The electronic device of claim 11, wherein the bus controller is further configured to:
provide one or more bus commands to a system bus, wherein the one or more bus commands respectively correspond to one or more of the plurality of fractional data transactions; and
receive one or more acceptance notifications indicating that the one or more of the plurality of fractional data transactions have been accepted by the system bus.

19. The electronic device of claim 11, wherein:
the received one or more completion notifications include a TID completion notification indicating that the system bus has completed one or more data transactions of the plurality of fractional data transactions;
the bus controller is further configured to:
in response to the receiving of the TID completion notification, store a status indicator indicating that the fractional data transaction is complete;
determine whether all TIDs associated with the data exchange tag are complete; and
in response to a determination that all TIDs associated with the data exchange tag are complete, send a tag completion notification to the processor; and
the processor is further configured to perform other processing tasks, wherein the other processing tasks are contingent upon completion of the data exchange.

20. The electronic device of claim 11, wherein the electronic device is selected from the group consisting of a set top box, a music player, a video player, an entertainment unit, a navigation device, a personal digital assistant (PDA), a fixed location data unit, a computer, a laptop, a tablet, a communications device, and a mobile phone.

21. An apparatus, comprising:
means for generating and sending a data exchange request comprising a data exchange tag that uniquely identifies a data exchange;
means for splitting the data exchange indicated by the data exchange tag that uniquely identifies the data exchange into a plurality of fractional data transactions;
means for assigning unique transaction identifiers (TIDs) to each of the plurality of fractional data transactions different than the data exchange tag;
means for receiving one or more completion notifications indicating that one or more of the plurality of fractional data transactions have been completed;
means for determining, in response to the one or more completion notifications, that each of the plurality of fractional data transactions have been completed; and
means for notifying that the data exchange has been completed in response to the determination that each of the plurality of fractional data transactions has been completed.

22. The apparatus of claim 21, further comprising means for determining whether a system bus is congested or not congested.

23. The apparatus of claim 22, wherein the means for determining whether the system bus is congested comprises:
means for determining that a number of outstanding data transactions is greater than a number of outstanding data transactions threshold;
means for determining that an amount of outstanding data is greater than an outstanding data amount threshold;
means for determining that system bus statistics indicate congestion; or
any combination thereof.

24. The apparatus of claim 22, further comprising:
means for aborting at least one of the plurality of fractional data transactions in response to a determination that the system bus is congested;
means for sending a status notification indicating an incomplete status of the requested data exchange in response to the determination that the system bus is congested;
means for monitoring the system bus to determine whether the congestion of the system bus is relieved or not relieved; and
means for providing a relief notification indicating that the congestion of the system bus is relieved in response to a determination that the congestion of the system bus is relieved.

25. The apparatus of claim 24, further comprising means for performing other processing tasks in response to the status notification, wherein the other processing tasks are not contingent upon completion of the data exchange.

26. The apparatus of claim 24, further comprising means for resuming, aborting, or deferring the data exchange in response to the relief notification.

27. The apparatus of claim 21, wherein the means for splitting comprises means for splitting the requested data exchange in response to a determination that a system bus is not congested and the apparatus further comprises:
- means for transmitting a data exchange request, wherein the data exchange request includes the data exchange tag;
- means for receiving an acceptance notification indicating that the requested data exchange has been accepted; and
- means for performing other processing tasks in response to the acceptance notification, wherein the other processing tasks are not contingent upon completion of the requested data exchange.

28. The apparatus of claim 21, further comprising:
- means for providing one or more bus commands, wherein the one or more bus commands respectively correspond to one or more of the plurality of fractional data transactions; and
- means for receiving one or more acceptance notifications indicating that the one or more of the plurality of fractional data transactions have been accepted.

29. The apparatus of claim 21, wherein the received one or more completion notifications include a TID completion notification indicating that a system bus has completed one or more data transactions of the plurality of fractional data transactions, and the apparatus further comprises:
- means for storing a status indicator indicating that the fractional data transaction associated with the TID is complete in response to the receiving of the TID completion notification;
- means for determining whether all TIDs associated with the data exchange tag are complete;
- means for sending a tag completion notification in response to a determination that all TIDs associated with the data exchange tag are complete; and
- means for performing other processing tasks, wherein the other processing tasks are contingent upon completion of the data exchange.

30. The apparatus of claim 21, wherein the apparatus is incorporated in a device selected from the group consisting of a set top box, a music player, a video player, an entertainment unit, a navigation device, a personal digital assistant (PDA), a fixed location data unit, a computer, a laptop, a tablet, a communications device, and a mobile phone.

* * * * *